United States Patent [19]
Klugman

[11] 3,764,034
[45] Oct. 9, 1973

[54] MODULAR STRUCTURAL MEMBER AND METHOD AND APPARATUS FOR MAKING SAME

[75] Inventor: Warren L. Klugman, Berea, Ohio

[73] Assignee: Ceilcote Company, Berea, Ohio

[22] Filed: May 4, 1970

[21] Appl. No.: 34,333

[52] U.S. Cl. .............................................. 220/4 E
[51] Int. Cl. ........................................... B65d 11/10
[58] Field of Search .................... 220/4 R, 4 E, 4 B, 220/4 F

[56] References Cited
UNITED STATES PATENTS

| | | | |
|---|---|---|---|
| 2,944,694 | 7/1960 | Kinsey | 220/17 |
| 3,256,975 | 6/1966 | Puente | 220/22 X |
| 2,800,945 | 7/1957 | Schilling | 220/4 R UX |
| 3,263,853 | 8/1966 | Smith | 220/4 R |

FOREIGN PATENTS OR APPLICATIONS

| | | | |
|---|---|---|---|
| 1,271,637 | 8/1961 | France | 220/4 E |

Primary Examiner—George E. Lowrance
Attorney—Meyer, Tilberry and Body

[57] ABSTRACT

A one-piece modular structural member formed of reinforced synthetic plastic material includes a pair of wall portions extending perpendicular to one another. The structural member is designed so that two such members may be reversely positioned and joined together to form a substantially rectangular duct or receptacle. The wall portions of the structural member may have recesses integrally formed therein for supporting beams or the like. A method and apparatus for making such a modular structural member includes the use of adjustable flange means so that the modular structural member may be formed in a plurality of different sizes on the same forming apparatus. In the method, fibrous glass mat is laid on a form and wetted with curable synthetic plastic material. The fibrous glass and resin extend up the flange means to form integral joining flanges on the structural member.

3 Claims, 14 Drawing Figures

Patented Oct. 9, 1973

INVENTOR.
WARREN L. KLUGMAN
BY
Meyer, Tilberry & Body
ATTORNEYS

INVENTOR.
WARREN L. KLUGMAN
BY Meyer, Tilberry & Body
ATTORNEYS

3,764,034

MODULAR STRUCTURAL MEMBER AND METHOD AND APPARATUS FOR MAKING SAME

BACKGROUND OF THE INVENTION

This application pertains to the art of modular structural members formed of reinforced synthetic plastic material and a method apparatus for making same. More particularly, the application pertains to structural members which may be reversely positioned and joined together to form a duct or receptacle. The invention is particularly applicable to receptacles for liquid-gas contact apparatus, such as air scrubbing devices, although it will be appreciated that the invention has broader applications and may be used in other environments.

Liquid-gas contact apparatus, such as air scrubbing apparatus for removing pollutants from air, commonly include a receptacle containing a large number of packing elements. The surfaces of the packing elements are wetted with liquid and an air stream containing pollutants flows through the packing elements. Pollutants in the air stream are absorbed or diffused into the liquid on the packing elements and are washed away to purify the air stream. Receptacles for use in such apparatus must be manufactured in a variety of sizes depending upon the amount of air to be purified. Duct work leading to and from the receptacle must also be provided in a variety of sizes. Receptacles of the type described are commonly formed of reinforced synthetic plastic material which is non-corrosive and non-reactive with pollutants in the air stream. Such receptacles are commonly formed by a hand lay-up procedure in which layers of fibrous glass mat are positioned on a form and impregnated with synthetic plastic material.

Previous receptables of the type described have been formed in both rectangular and cylindrical shapes. Previous rectangular units have been custom-built from a plurality of individual wall panels and corner members, or have been made in one-piece on a specially constructed rectangular form. With one-piece cylindrical or rectangular shapes, it is necessary to have a large number of forms of various sizes so that a receptacle of the optimum size may be provided for a particular air scrubbing application. The need for a large number of different size forms requires a considerable amount of space in a manufacturing operation and certain sizes may go unused for large periods of time. In addition, shipment of one-piece receptacles occupies a large amount of space. On cylindrical receptacles, the addition of inlet and outlet ducts, and other fittings, is very complicated due to the curved surfaces of the receptacle. Furthermore, the addition of fittings to a one-piece cylindrical or rectangular receptacle requires a large amount of manual labor inside of the receptacle where working conditions are difficult and noxious fumes are present from adhesives and synthetic resins used when attaching fittings and making joints.

SUMMARY OF THE INVENTION

In accordance with the present invention, a one-piece modular structural member formed of reinforced synthetic plastic material is specially constructed so that two of the members may be joined together to form a duct or receptacle. More specifically, the modular structural member includes first and second rectangular wall portions positioned perpendicular to one another. Each of the first and second wall portions has first and second side edges, and the second side edges are coincidental with one another to form a common edge or corner for the modular structural member. Each of the first and second wall portions further includes top and bottom edges and the top edges have integral flange means extending outwardly therefrom. The first wall portion also has flange means extending rearwardly from its first side edge. Either or both of the wall portions may have integral recesses formed therein for supporting beams or the like. Each wall portion may also include reinforcing ribs or corrugations which strengthen the wall portions against bending. In a preferred arrangement, the modular structural member further includes an integral triangular bottom wall portion. The triangular wall portion has first and second triangle edges substantially perpendicular to one another and coincidental with the bottom edges of the first and second wall portions. A third triangle edge extends from the intersection of the first side edge with the bottom edge of the first wall portion, to a point spaced inwardly from the first side edge of the second wall portion. A pair of such modular structural members are positionable in reverse relationship and secured together to form a rectangular duct or rectangular receptacle. Either of the first or second wall portions may have inlet or outlet ducts, or other fittings formed therewith.

In accordance with another aspect of the invention, apparatus for making modular structural members of the type described is adjustable so that modular structural members of different sizes may be formed on the same apparatus. The forming apparatus includes first and second panel members positioned perpendicular to one another and extending outwardly from a common corner edge. Elongated flange members are adjustably positioned on the first and second panel members for selective positioning longitudinally of the panel members. These flange members define the height of the rectangular wall portions of a modular structural member to be formed, and are also utilized to form the integral flanges on the modular structural member. Another flange member is adjustably positioned on at least one of the panel members for selective positioning laterally thereof to vary the lateral dimension of at least one of the wall portions on a modular structural member. The forming apparatus further includes a triangular bottom panel which forms the triangular bottom wall of the modular structural member. Rib members are selectively positionable on the first or second panel members to form integral supporting recesses or reinforcing corrugations in the walls of the modular structural member. Fibrous glass mat is laid on the forming apparatus and saturated with synthetic resin. The resin is allowed to cure the results in the formation of a one-piece modular structural member of the type described.

It is a principal object of the present invention to provide a one-piece modular structural member of reinforced synthetic plastic material which is simple in construction and economical to manufacture.

It is also an object of the present invention to provide a modular structural member which is cooperable with an identical member to form a rectangular duct or receptacle.

It is a further object of the present invention to provide such a modular structural member with integral supporting recesses or fitting attachments formed therewith.

It is an additional object of the present invention to provide an improved forming apparatus for making of modular structural members of various dimensions.

It is another object of the present invention to provide such a forming apparatus which is economical to construct and easily modified to form modular structural members having various dimensions and fitting attachments.

It is a further object of the present invention to provide an improved method for making a modular structural member with integral joining flanges.

BRIEF DESCRIPTION OF THE DRAWING

The invention may take physical form in certain parts and arrangements of parts, a preferred embodiment of which will be described in detail in this specification and illustrated in the accompanying drawings which form a part hereof.

DESCRIPTION OF THE PREFERRED EMBODIMENT

Figures 1, 2, 3, 4, 5:
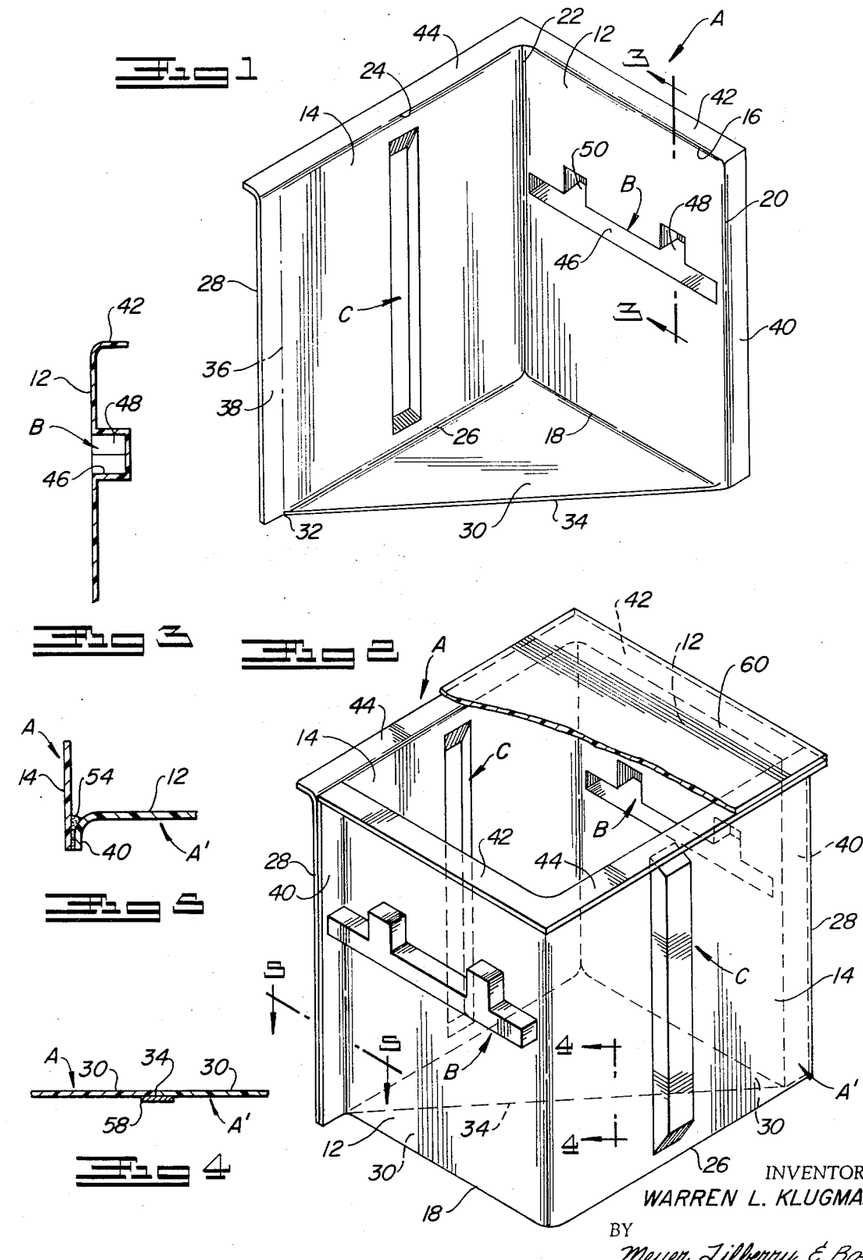
FIG. 1 is a perspective illustration of a modular structural member constructed in accordance with the present invention.
FIG. 2 is a perspective illustration showing a pair of the modular structural members of FIG. 1 secured together to form a rectangular receptacle.
FIG. 3 is a cross-sectional elevational view looking in the direction of arrows 3—3 of FIG. 1.
FIG. 4 is a cross-sectional elevational view looking in the direction of arrows 4—4 of FIG. 2.
FIG. 5 is a cross-sectional elevational view looking in the direction of arrows 5—5 of FIG. 2.

Referring now to the drawings, wherein the showings are for purposes of illustrating the preferred embodiment of the invention only and not for purposes of limiting same, FIG. 1 shows modular structural member A constructed in accordance with the present invention. Modular structural member A is constructed in one-piece of reinforced synthetic plastic material, and includes first and second rectangular wall portions 12 and 14. Rectangular wall portions 12 and 14 may be of any desired dimensions and may be square if so desired. In that regard, it will be recognized that a square is merely a special form of rectangle. First rectangular wall portion 12 includes top edge 16 and bottom edge 18 which extend in parallel spaced-apart relationship. First rectangular wall portion 12 further includes a first side edge 20 and a second side edge defined by a common corner edge 22 for structural member A. First side edge 20, and the second side edge defined by common corner edge 22, extend in parallel spaced-apart relationship perpendicular to top and bottom edges 16 and 18. Second rectangular wall portion 14 includes top edge 24 and bottom edge 26 which are positioned in parallel spaced-apart relationship. Second wall portion 14 further includes a first side edge 26 and a second side edge defined by common corner edge 22. First side edge 26, and the second side edge defined by common corner edge 22, are positioned in parallel spaced-apart relationship. It will be recognized that the second side edges of both rectangular wall portions 12 and 14 are coincidental and are defined by common corner edge 22. First and second wall portions 12 and 14 extend perpendicular to one another from common corner edge 22. Top edges 16 and 24 of wall portions 12 and 14 lie in a common first plane while bottom edges 18 and 26 lie in a common plane parallel to the first plane.

In accordance with a preferred arrangement, modular structural member A further includes a triangular bottom wall portion 30 which lies in a common plane with bottom edges 18 and 26. Triangular bottom wall 30 includes a first triangle edge which is coincidental with, and common to, bottom edge 18 of rectangular wall portion 12. Such first triangle edge is also coextensive in length with bottom edge 18. Triangular bottom wall portion 30 includes a second triangle edge which is coincidental with, and common to, bottom edge 26 of rectangular wall portion 14. This second triangle edge terminates short of first side edge 28 of wall portion 14 at a termination point 32. Triangular bottom wall 30 has a third triangle edge 34 extending from the intersection point of bottom edge 18 and first side edge 20, to termination point 32. A line 36 extending parallel to first side edge 28 through termination point 32 defines an inner end surface portion 38 which extends from first side edge 28 to line 36, and the full height of second wall portion 14 from top edge 24 to bottom edge 26.

In accordance with the invention, first flange means 40 is formed integrally with first wall portion 12 and extends outwardly from first side edge 20 perpendicular to wall portion 12. First flange means 40 extends the full height of wall portion 12 between top edge 16 and bottom edge 18, and extends outwardly from wall portion 12 in a direction opposite to that in which second wall portion 14 extends. Wall portion 12 includes second flange means 42 formed integrally therewith and extending outwardly from top edge 16 perpendicular to wall portion 12 in the same direction as first flange means 40. Third flange means 44 is formed integral with second wall portion 14 and extends outwardly from top edge 24 perpendicular to wall portion 14 in a direction opposite to that in which first wall portion 12 extends. First, second and third flange means 40, 42 and 44 are integral with one another at their intersection points and define a continuous flange.

In a preferred arrangement, first rectangular wall portion 12 has recess means B formed integrally therein. Recess means B includes a horizontal supporting ledge 46 and may include enlarged recess portions 48 and 50. End portions of I-beams or T-beams, or other structural shapes, may be supported on supporting ledge 46. End portions of such beams may also be received in enlarged recess portions 48 and 50. It will be recognized that recess B has a back wall which is continuous with wall portion 12 so that there is no opening formed completely through wall portion 12. In addition, recess B may take any desired shape depending upon the purpose for which it will be used. It will also be recognized that recess B defines a corrugation in wall portion 12 which extends in a direction from first side edge 20 toward common edge 22 and reinforces wall portion 12 against bending. A longitudinal recess C is formed in second wall portion 14 and defines a reinforcing corrugation which stiffens wall portion 12 against bending. It will be recognized that such reinforcing corrugations may be formed wherever desired in either of wall portions 12, 14 or 30. It will also be recognized that supporting recess B may be formed in either or both of wall portions 12 and 14.

In accordance with the invention, a pair of modular structural members A of FIG. 1 may be positioned in reverse relationship and joined together as shown in FIG. 2. For convenience of description and illustration, modular structural member A may be termed a first modular structural member while an identical structural member A' may be termed a second structural member. First and second modular structural members A and A' have their first rectangular wall portions 12 positioned in parallel spaced-apart relationship and their second rectangular wall portions 14 positioned in parallel spaced-apart relationship. First flange 40 of first structural member A is positioned in abutting relationship against the inner end surface portion of structural member A' which corresponds to inner end surface portion 38 of FIG. 1. Likewise, first flange 40 of second structural member A' is positioned in abutting relationship against the inner end surface portion of first structural member A which corresponds to inner end surface portion 38 of FIG. 1. In the preferred arrangement, these abutting surfaces are joined to one another by adhesive 54 as shown in FIG. 5. Third triangle edges 34 on triangular bottom wall portions 30 of both first and second structural members A and A' are positioned in abutting relationship. The connection between first flange 40 on first structural member A and the inner end surface portion of second structural member A' may be termed a first joining surface. The joint between first flange 40 on second structural member A' and the inner end surface portion of first structural member A may be termed a second joining surface. The joint formed by abutting third triangular edges 34 of triangular wall portions 30 may be termed a third joining surface. The abutting joint between third triangle edges 34 of bottom wall portions 30 on first and second structural members A and A' may be joined by overlaying or strapping with synthetic resin and fibrous mat as shown in FIG. 4. A length of fibrous glass mat 58 may be wetted with resin and secured to bottom wall portions 30, and extend completely along the entire abutting line between third triangle end portions 34. Additional synthetic resin may be applied to fibrous glass mat 58, and additional layers of mat and resin may be applied, to completely seal this joint. This overlaying or strapping of joints with mat and resin is preferably always done on the inside of the receptacle and may also be done on the outside as shown.

The resulting joining of two structural members results in a rectangular receptacle. Second and third flanges 42 and 44 on first structural member A lie in a common plane with second and third flanges 42 and 44 on second structural member A'. A cover or lid member 60 may be positioned on flanges 42 and 44 of structural members A and A' and secured thereto as by adhesive. With the arrangement described, it will be recognized that recesses B in wall portions 12 of structural members A and A' may receive opposite end portions of beams or the like for supporting grids or packings within the receptacle defined by the two joined structural members. Additional recesses B may be formed of various shapes and at various positions in either wall portions 12 or 14 for supporting various elements within the receptacle defined by the two joined structural members.

Figure 6:
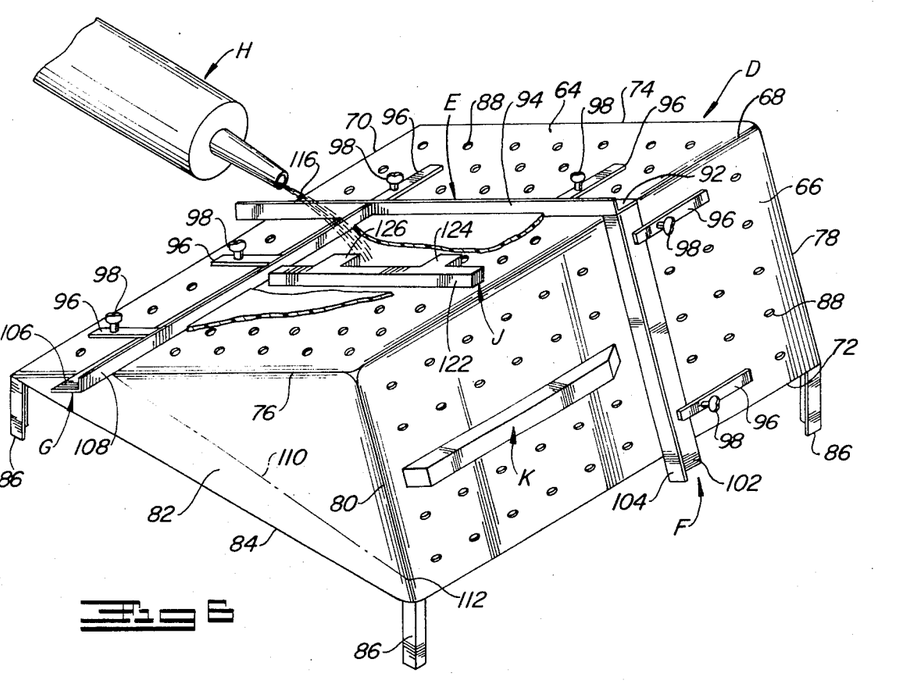
FIG. 6 is a perspective illustration of the improved forming apparatus of the present invention for making the modular structural member of FIGS. 1 and 2.

In accordance with the invention, an improved forming apparatus is provided for forming the modular structural member of FIG. 1. As shown in FIG. 6, forming apparatus D includes first and second rectangular panels 64 and 66. Rectangular panel members 64 and 66 may be formed of any suitable material such as metal, plastic or wood. Panels 64 and 66 are positioned in perpendicular relationship and extend outward from a common corner edge 68. First panel 64 includes a first side edge 70 and a second side edge which is coextensive with and defined by common corner edge 68. Second panel 66 includes a first side edge 72 and a second side edge which is coextensive with and defined by common corner edge 68. First panel 64 includes top edge 74 and bottom edge 76 which are positioned in parallel spaced-apart relationship. Second panel 66 also has top edge 78 and bottom edge 80 positioned in parallel spaced-apart relationship. Apparatus D further includes a bottom triangular panel 82 having a first triangle edge which is coincidental with bottom edge 76 of first panel 64 and a second triangle edge which is coextensive with bottom edge 80 of second panel 66. Triangular bottom panel 82 further includes a third edge 84 which extends from the intersection point between side edge 70 and bottom edge 76, to the intersection point between side edge 72 and bottom edge 80. Panels 64, 66 and 82 may be secured to a framework which includes supporting legs as at 86. Triangular bottom panel 82 is perpendicular to rectangular panels 64 and 66. The abutting edges of panels 64, 66 and 82 may be secured together as by welding or adhesive, or simply by left abutting due to securement of the respective panels on a supporting framework as by welding or adhesive.

In one arrangement, each of panels 64 and 66 is provided with a plurality of spaced-apart holes, only one of which is indicated on each panel by numeral 88. In accordance with the invention, a first flange member E is adjustably attached to first panel member 64. Flange member E includes leg portions 92 and 94 extending perpendicular to one another. Clamping rods 96 are positioned with end portions thereof overlying leg portion 92 and securing elements 98 extend through suitable holes in clamping rods 96 and holes 88 in panel 64. Securing elements 98 may be snap fasteners which snap-lock through holes 88, or may be in the form of threaded bolts having enlarged heads on one end with nuts being threaded thereon on the under side of panel 64 to tightly clamp clamping rods 96 to panel 64 and securely hold first flange member E in position. It will be recognized that there are many different ways of adjustably and releasably clamping first flange member E to panel 64. For example, the bottom surface of leg portion 92 of flange member E may have double pressure sensitive tape applied thereto so that flange member E will be adhesively and releaseably secured to panel 64. Such a securing arrangement would require no holes in the panel members. In addition, threaded studs may be welded to the bottom surface of leg portion 92 and extend through holes 88 for receiving nuts on the reverse side of panel member 64. First flange member E is positioned perpendicular to common corner edge 68 and extends from common corner edge 68 to first side edge 70. It will be recognized that clamping rods 96 and securing elements 98 may be positioned at any point along panel member 64 for adjustably securing first flange member E in any desired position between top and bottom edges 74 and 76. That is, first flange member E is adjustably movable in a direction from top edge 74 toward bottom edge 76, or from bottom edge 76 toward top edge 74. Therefore, the distance between bottom edge 76 and first flange member E is adjustably variable. A second flange member F having leg portions 102 and 104 perpendicular to one another is adjustably positioned on panel member 66 in the same manner as described with reference to first flange member E. In the preferred arrangement, the surfaces of leg portions 94 and 104 extend upwardly perpendicular to panel members 64 and 66. Second flange member F also extends perpendicular to common corner edge 68 and spans the entire distance from common corner edge 68 to first side edge 72. Second flange member F may be adjustably secured to panel member 66 in any desirable position between top edge 78 and bottom edge 80 in the same manner as described with reference to first flange member E. In the preferred arrangement for forming the improved modular structural member of FIG. 1, second flange member F abuts first flange member E at common corner edge 68 and the outer surfaces of leg portions 94 and 104 lie in a common plane. A third flange member G having leg portions 106 and 108 is adjustably secured to panel member 64. Third flange member G is adjustably secured to panel member 64 by clamping rods 96 and securing elements 98 in the same manner as described with reference to first flange member E. Leg portion 108 extends upwardly perpendicular to panel 64 and third flange member G abuts against first flange member E. Third flange member G extends along panel member 64 parallel to common corner edge 68 and is adjustably positioned for movement in directions either parallel to common corner edge 68 or perpendicular thereto. Third flange member G is preferably of a length to extend the full distance from top edge 74 to bottom edge 76 and one end portion thereof will overhand bottom edge 76 when first flange member E is positioned inwardly from top edge 74 as shown in FIG. 6.

For purposes of describing the use of assembly apparatus D, a line referenced by numeral 110 may be drawn from the intersection point of bottom edge 76 with third flange member G, to a termination point 112 spaced upwardly along bottom edge 80 from the intersection point of side edge 72 with third triangle edge 84.

With apparatus D of FIG. 6 arranged as described, a first rectangular area is encompassed within common corner edge 68, bottom edge 76, first flange member E and third flange member G. A second rectangular area is encompassed within first side edge 72, bottom edge 80, common corner edge 68 and second flange member F. A third area of triangular shape is encompassed within bottom edge 76, bottom edge 80 and line 110. The outer surfaces of leg portions 94, 102 and 108 of flange members E, F and G extend outwardly from edges of the first and second rectangular areas. It will be recognized that the three areas, along with the surfaces of leg portions on the flange members, correspond to the internal surface shape of the modular structural member of FIG. 1.

In manufacturing the modular structural member of FIG. 1, the defined areas are first covered with a release agent to prevent sticking. This release agent may be in the form of wax, polyvinyl acetate, silicone compounds, or other common and commercially available agent. The defined areas may also be covered with a release material defined by a thin and strong film of plastic material in sheet form. These entire areas are then covered by fibrous glass mat laid over the release agent. The fibrous glass mat is then wetted with resin 116 from a suitable applicator H. Resin material 116 may be applied to the fibrous glass mat by a spraying, pouring or brushing and the applicator shown on FIG. 6 is merely diagramatic. Successive layers of fibrous glass mat may be applied over the first layer and successive layers are wetted with resin material. During these operations, the fibrous glass mat and resin material may be rolled or brushed to remove air bubbles therefrom and to smooth the layers in a known manner. The reinforcing fibrous glass mat may be of woven or cloth type and may be of the chopped strand type, continuous strand or needled. The resin may be a polyester resin which is non-corrosive and non-reactive with pollutants of the type commonly found in air streams. As is known, polyester resin is a condensation polymer resulting from the reaction of dicarboxylic acids with glycols and are linear polymers. Unsaturated polyester resin is preferred for use with the present invention and is of the hand lay-up type. Polyester resins such as Laminac, available from American Cyanamid Corporation, and Hetron, available from Hooker Chemical Company, are suitable. The polyester resin is preferably self-curing at room temperature although it will be recognized that heat lamps may be directed against forming apparatus D to speed-up the cure or to allow the use of resins requiring higher temperatures for curing. The fibrous glass mat and resin material is applied to forming apparatus D so as to extend upwardly from panel 64 and 66 in contact with the outer surfaces of legs 94, 104 and 108 of flange members E, F and G. If desired, it will be recognized that an additional flange member, similar to glange members E, F and G may be attached to triangular bottom panel 82 in an adjustable manner and positioned along line 110. With the arrangement described, the resin and fibrous glass mat applied to panel 66 defines wall portion 14 of FIG. 1, that material applied to panel 64 defines wall portion 12 of FIG. 1; that material applied to bottom panel 82 within line 110 defines bottom wall 30 of FIG. 1; that material applied against leg 108 of flange member G defines first flange 40 of FIG. 1; that material applied upwardly in contact with leg 94 of first flange member E defines second flange 42 of FIG. 1; and that material applied upwardly against leg 104 of second flange member F defines third flange 44 of FIG. 1. That material applied to panel 66 from first side edge 72 up to a line parallel to side edge 72 and extending through termination point 112 defines inner end surface portion 38 of FIG. 1. By moving flange members E, F and G to new locations on panel 64 and 66 it will be recognized that modular structural members of various sizes may be produced on forming apparatus D. Therefore, it is necessary to have only one forming apparatus and receptacles of various volumes may be produced simply by relocating the adjustable flange members.

In accordance with the invention, supporting recess B of FIG. 1 may be formed by positioning rib means J on panel 64 as shown in FIG. 6. Rib means J may include an elongated portion 122 extending parallel to first flange member E to form supporting ledge 46 of FIG. 1, and a pair of portions 124 and 126 extending parallel to third flange member G for forming enlarged recess portions 48 and 50 of FIG. 1. An elongated rib member K may be positioned on panel 66 extending parallel to common corner edge 68 and terminating short of bottom edge 80 and second flange member F to form reinforcing recess C of FIG. 1. Ribs J and K may be held in position on panels 64 and 66 by releasable pressure sensitive adhesive, or by threaded studs secured to their bottom surfaces and extensible through holes 88 for receiving nuts on the reverse sides of panels 64 and 66. It will be recognized that rib members J and K are also adjustably positionable in various locations on panels 64 and 66, and any number of such rib members of different shapes may be provided. With the use of rib members J and K, and polyester film, fibrous glass mat and polyester resin are applied over such ribs to form recesses or reinforcing corrugations integrally in the walls of the modular structural member of FIG. 1.

Instead of positioning third flange member G on panel member 64 it will be recognized that it is also possible to position such flange member on panel 66 if so desired. That is, instead of forming flange 40 of FIG. 1 on wall portion 12 it is possible to form that flange on wall portion 14 and to form end surface portion 38 on wall portion 12. In addition, an addition flange member may be positioned on panel member 66 extending parallel to common corner edge 68 in order to vary the width of wall portion 14 from common corner edge 22 to first side edge 28. After formation of a modular structural member as described, it will be recognized that the edges may be trimmed as necessary.

Figure 13:
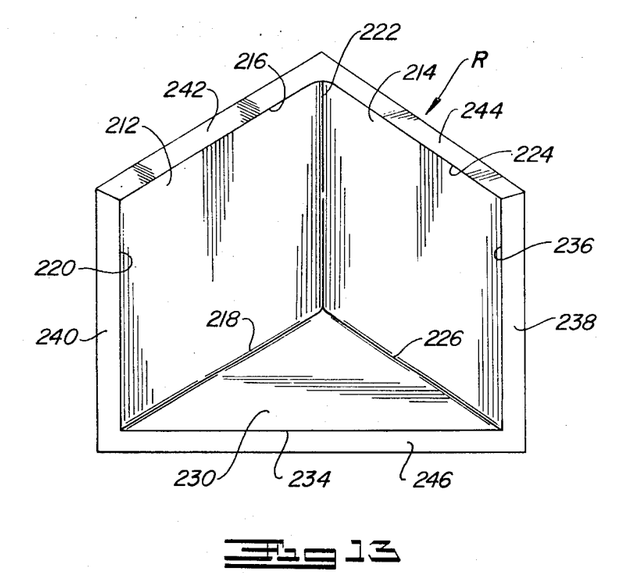
FIG. 13 is a perspective illustration of a modified form of modular structural member constructed in accordance with the present invention.
Figure 14:
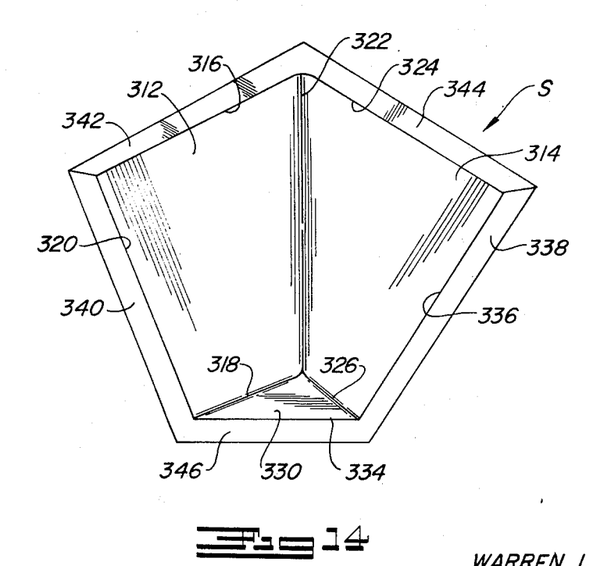
FIG. 14 is a perspective illustration of another modified form of modular structural member constructed in accordance with the present invention.

In adhesively securing a pair of modular structural members together, any well known primer compatible with the polyester structure and the adhesives to be used may be applied to the surfaces to be joined. Adhesive material such as epoxy, phenolic-nitrile or polyester is then applied to the surfaces to be joined. The surfaces are then clamped together while the adhesive sets. It will be recognized that it is also possible to use gasketing material in the joints between a flange 40 and an inner end surface portion 38 and to use bolts or other mechanical fastening devices. In addition, it will be recognized that it is possible to form a flange similar to flange 40 extending along third triangle edge 34 downwardly from bottom triangular wall 30. In addition, it is possible to form flange 40 and inner end surface portion 38 extending in alignment with, and parallel to, third triangle edge 34. With that type of arrangement, a continuous flange lying in a common plane may be formed along first side edge 20, third triangle edge 34 and extending outwardly from line 36. Such an arrangement merely requires a third flange member G having a leg portion 108 extending at an acute angle to panel 64 rather than being perpendicular thereto, and another flange member positionable on panel member 66 so that inner end surface portion 38 will define a flange lying in a common plane with third triangle edge 34. Such an arrangement is shown in FIG. 13 wherein modular structural member R has first and second rectangular wall portions 212 and 214 extending in perpendicular relationship to one another from common corner edge 222. First wall portion 212 includes top edge 216, bottom edge 218 and first side edge 220. Second wall portion 214 includes top edge 224, bottom edge 226 and first side edge 236. Flanges 242 and 244 are formed integral with modular structural member R and extend rearwardly from top edge 216 and 224 perpendicular to wall portions 212 and 214. Flanges 238 and 240 extend outwardly from first side edges 220 and 236. An additional flange member 246 extends downwardly from triangle edge 234 in perpendicular relationship to triangular bottom wall 230. Flanges 238, 240 and 246 lie in a common plane and are integral at their intersections. It will be recognized that two modular structural members R may be positioned in reverse relationship and secured together by bolts or adhesive extending through flanges 238, 240, and 246 on the two structural members. Another arrangement is shown in FIG. 14 wherein modular structural member S includes first and second plane wall portions 312 and 314 extending in perpendicular relationship from a common corner edge 322. First wall portion 312 includes parallel top and bottom edges 316 and 318, and side edge 320 which slopes inward toward common corner edge 322 from top edge 316 to bottom edge 318. Second wall portion 314 includes parallel top and bottom edges 324 and 326, and side edge 336 which slopes inward toward common corner edge 322 from top edge 324 to bottom edge 326. Flanges 342 and 344 extend rearwardly from top edges 316 and 324 in perpendicular relationship to wall portions 312 and 314. Another flange 346 extends downwardly from triangle edge 334 in perpendicular relationship to triangular bottom wall portion 330. Side flanges 338 and 340 extend outwardly from side edges 336 and 320 and lie in a common plane with flange 346. Flanges 338, 340 and 346 define a continuous flange. It will be recognized that two of structural members S may be positioned in reverse relationship with their flanges 338, 340 and 346 in abutting relationship to define a receptacle. The flanges may then be secured together as by bolting or with adhesive. A receptacle defined by a pair of structural members S will be rectangular and decrease in rectangular size from its open top toward bottom wall portion 330. It will also be recognized that in place of top cover member 60 of FIG. 2 it is possible to invert an identical receptacle like that shown in FIG. 2 and position it on top of the receptacle shown in FIG. 2. In this manner, a receptacle having double the volume of that shown in FIG. 2 may be formed by utilizing four of the modular structural members of FIGS. 1, 13 or 14.

It will also be recognized that it is possible to omit bottom triangular wall portion 30 and to join two modular structural members together in the manner described for forming rectangular ducts. With such an arrangement, flanges identical to second and third flanges 42 and 44 may be formed along bottom edges 18 and 26 so that adjacent duct sections may be attached together by use of the flanges. Formation of such flanges simply requires additional flange members positioned adjacent bottom edges 76 and 80 of forming apparatus D.

Figure 7:
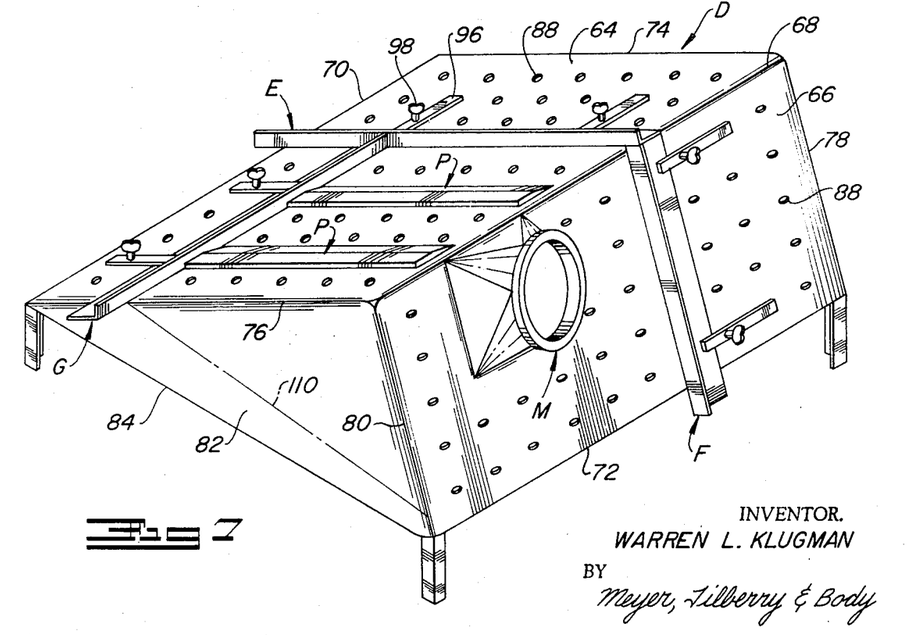
FIG. 7 is a perspective illustration similar to FIG. 6 and showing additional attachments positioned on the improved forming apparatus of the present invention.
Figures 8, 9, 10, 11, 12:
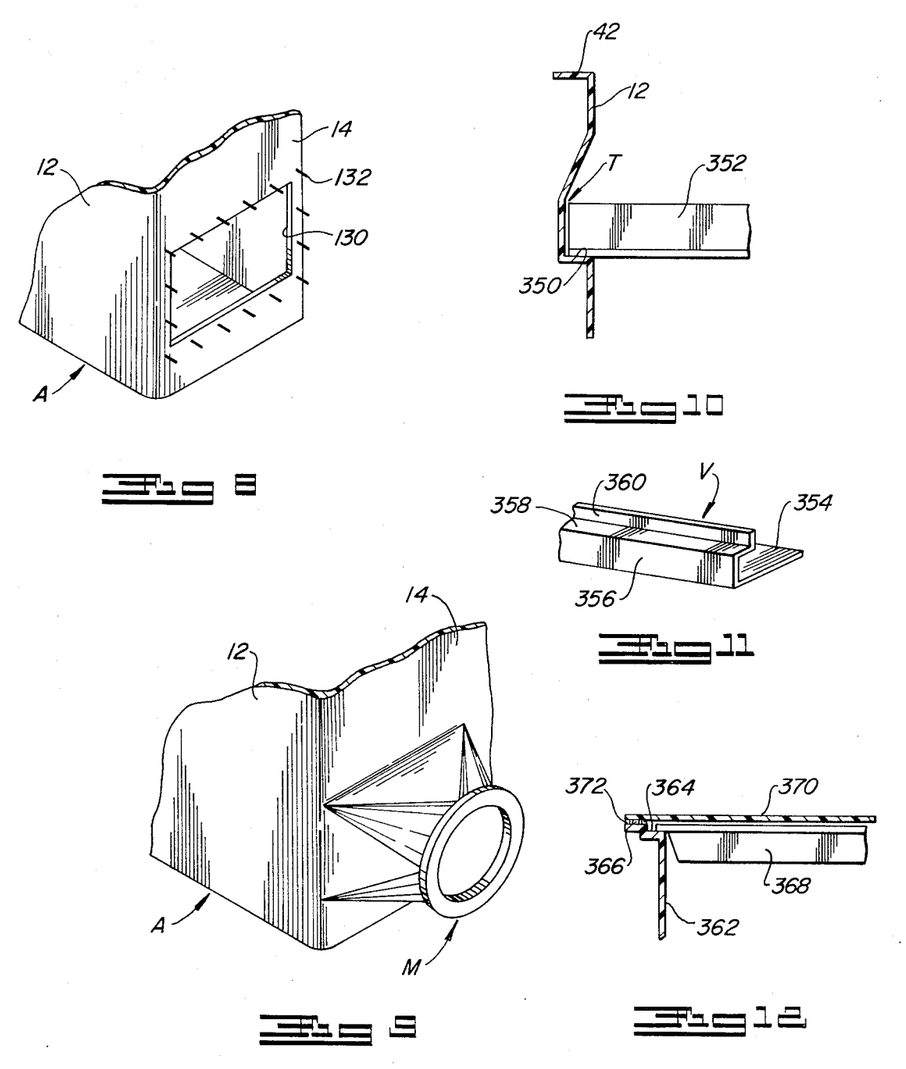
FIG. 8 is a partial perspective illustration showing the improved modular structural member of the present invention having integral fitting attachments formed thereon.
FIG. 9 is a partial perspective illustration of the improved modular structural member of the present invention having another fitting attachment means formed thereon.
FIG. 10 is a partial cross-sectional elevational view of a wall portion of a modular structural member having a supporting recess formed therein by utilizing the apparatus of FIG. 7.
FIG. 11 is a partial perspective illustration of a modified flange member for use with the apparatus of FIGS. 6 and 7 to form a supporting recess in the top edge of the wall portions of a modular structural member.
FIG. 12 is a partial cross-sectional elevational illustration showing a top edge of a wall portion constructed with the flange member of FIG. 11.

In accordance with one arrangement, it is possible to form inlet or outlet ducts, or other fittings, integrally in either of wall portions 12 or 14 of FIG. 1. For example, a conventional duct member M may first be formed on a forming apparatus having the desired shape. Duct member M is preferably also formed of fibrous glass mat reinforced polyester resin. Duct member M is then positionable on panel 66 as shown in FIG. 7. Duct member M may be secured to panel member 66 by extending screws through holes 88 and into the rear edge of duct member M. Fibrous glass mat is then positionable on forming apparatus D as previously described and simply laid up around the rear edges of duct member M. Application of further layers of polyester resin and fibrous glass mat results in a modular structural member having duct M integral with wall portion 14 as shown in FIG. 9. In addition, various types and shapes of ribs such as those shown at P in FIG. 7 may be positioned on either panel 64 or 66 to form supporting recesses or reinforcing corrugations in the wall portions of the modular structural member. Such reinforcing corrugations or support recesses as formed by ribs P are shown at T in FIG. 10. Recess T includes a horizontal bottom edge 350 on which the end portion of an inverted T-beam 352 is supported.

It will be recognized that it is also possible to position a block of any desirable shape on either of panels 64 and 66 to form an opening in either or both of the wall portions of a completed modular structural member. For example, a retangular block positioned on panel 66 is not covered with fiber glass mat or polyester resin during formation of the structural member. The fibrous glass mat and polyester resin are simply laid on the surface of panel 66 around the rectangular block. The resulting modular structural member will appear as shown in FIG. 8 with a rectangular opening 130 formed in wall portion 14, a plurality of spaced-apart holes may then be formed in wall 14 around opening 130 for receiving bolts or studs 132 having their heads encapsulated at the inner surface of wall 14. A duct of the type shown at M in FIG. 9 may then have a lateral flange with holes therethrough for receiving studs 132 and duct M may be bolted to wall portion 14, with suitable gasketing provided between the duct flange and the adjacent wall surface around rectangular opening 130. It will be readily apparent to those skilled in the art that various other fittings for connecting different types of ducts may be formed integrally in either or both of wall portions 12 or 14.

In accordance with another arrangement, first and second flange members E and F of FIGS. 6 and 7 may be replaced with a flange member V as shown in FIG. 11. Flange Member V includes a leg 354 which is positionable against panels 64 or 66 and secured in place with clamping rods 96 and securing elements 98. Flange member V further includes a first upwardly extending leg portion 356, a horizontal leg portion 358 and a second vertical leg portion 360. Fibrous glass mat and polyester resin laid up on the surfaces of leg portions 356, 358 and 360 will form a stepped upper edge on a modular structural member as shown in FIG. 12. Wall portion 362 of a modular structural member has a horizontal supporting ledge 364 which is formed by the fibrous glass mat and polyester resin laid against first vertical leg portion 356 of FIG. 11. Flange portion 366 is formed by fibrous glass mat and polyester resin laid against vertical leg portion 360. With this arrangement, end portions of I-beams or T-beams, or other structural shapes as at 368, may be supported on surface 364. Various devices may then be hung within a receptacle defined by a pair of joined modular structural members by suspending them from T-beam 368. In addition, a flat top cover member 370 may have its outer periferal surface secured to flange 366 as by adhesive 372 and T-beams 368 will provide additional support for top cover member 370.

It will be recognized that modular structural members of the type shown in FIG. 1 may be nested within one another for shipment in order to conserve space and assembled into receptacles as shown in FIG. 2 at the location in which the receptacle is to be used. The improved rectangular receptacle of the present invention may have any desired openings for access doors or connecting ducts formed therein. While a simple flat top member 60 has been shown in FIG. 2, it will be recognized that various top members may be provided and secured to flanges 42 and 44. Such top cover members may have inlet or outlet ducts and other fittings formed therein to provide access to the receptacle defined by a pair of connected modular structural members A. Such top cover members may also have corrugations formed therein of a type similar to that shown at C in FIG. 1 for reinforcing the top cover member against bending.

For purposes of description, it will be recognized that line 36 through termination point 32 in FIG. 1 may be termed an outer side edge of wall portion 14 with inner end surface portion 38 defining a joining flange which extends outwardly from line 36. With line 36 defining an outer side edge of wall portion 14, it will be recognized that side edges 20 and 36 lie in a common plane with diagonal triangle edge 34 and that joining flanges 40 and 38 project outwardly from the side edges. In addition, it will be recognized that flanges 342 and 344 of FIG. 14 do not project rearwardly perpendicular to wall portions 312 and 314. This is because wall portion 312 and 314 slope inward toward bottom wall portion 330. At any rate, flanges 342 and 344 have upper surfaces which lie in a common horizontal plane so that joining of two modular structural members S will provide a continuous rectangular flange at the top open end thereof and the upper surface of this flange will lie in a horizontal plane for meeting with a cover member.

While the invention has been described with reference to a preferred embodiment, it is obvious that modifications and alterations will occur to others skilled in the art upon the reading and understanding of this specification. The present invention includes all equivalent such modifications and alterations and is limited only by the scope of the claims.

Having thus described my invention I claim:

1. A substantially rectangular receptacle assembled from a pair of substantially identical one-piece modular structural members, each of said modular structural members including a pair of plane rectangular sidewalls extending perpendicular to one another and a triangular bottom wall extending perpendicular to said sidewalls, each of said modular structural members having an upper edge and opposite side edges, an upper flange extending outwardly from said upper edge substantially perpendicular to said sidewalls, a side flange extending outwardly from one of said side edges substantially perpendicular to one of said sidewalls and parallel to the other of said sidewalls, said bottom wall having an outer edge extending from said one side edge to a point spaced inwardly from the other of said side edges on said other sidewall so that said other sidewall has an outer side portion defining an abutment flange lying in a common plane with said other sidewall and forming an extension thereof, said pair of modular structural members being reversely positioned with said side flanges abutting said abutment flanges and with said outer edges of said bottom walls abutting.

2. The receptacle of claim 1 wherein said receptacle has an upper portion and two pairs of opposed sidewalls defined by said sidewalls of said structural members, and recess means formed in at least one of said pair of opposed sidewalls in said upper portion of said receptacle, said recess means including horizontal supporting surface portions.

3. The receptacle of claim 2 and further including substantially vertical reinforcing ribs formed at least in the other of said pair of opposed sidewalls.

* * * * *